(12) United States Patent
Knapczyk et al.

(10) Patent No.: US 10,393,210 B2
(45) Date of Patent: Aug. 27, 2019

(54) DUAL MODE HYDRAULIC DAMPER

(71) Applicant: BeijingWest Industries Co., Ltd., Beijing (CN)

(72) Inventors: Marcin Knapczyk, Cracow (PL); Waldemar Widla, Zabierzow Bochenski (PL); Pawel Slusarczyk, Myslenice (PL); Jakub Wrzesinski, Cracow (PL); Marcin Zborowski, Katowice (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/787,693

(22) Filed: Oct. 18, 2017

(65) Prior Publication Data

US 2018/0142756 A1 May 24, 2018

Related U.S. Application Data

(60) Provisional application No. 62/423,867, filed on Nov. 18, 2016.

(51) Int. Cl.
*F16F 9/46* (2006.01)
*F16F 9/348* (2006.01)

(52) U.S. Cl.
CPC .............. *F16F 9/466* (2013.01); *F16F 9/348* (2013.01); *F16F 9/463* (2013.01); *F16F 2230/18* (2013.01)

(58) Field of Classification Search
CPC .. F16F 9/466; F16F 9/463; F16F 9/348; F16F 2230/18
See application file for complete search history.

(56) References Cited

U.S. PATENT DOCUMENTS

| 4,723,640 A * | 2/1988 | Beck ..................... B60G 17/08 137/614.2 |
| 4,958,704 A * | 9/1990 | Leiber .................... F16F 9/368 188/267 |

(Continued)

FOREIGN PATENT DOCUMENTS

| CN | 102678810 B | 11/2013 |
| CN | 203548687 | 4/2014 |

(Continued)

OTHER PUBLICATIONS

European Search Report dated Apr. 19, 2018, for counterpart European Patent Application No. 17200607.A, 7 pages.

(Continued)

*Primary Examiner* — Vishal R Sahni
(74) *Attorney, Agent, or Firm* — William H. Honaker; Dickinson Wright PLLC

(57) ABSTRACT

A hydraulic damper includes a piston rod attached to a slidable piston assembly having a hollow housing with first and second valve assemblies disposed therein and each including a valve body and rebound and compression discs for regulating flow of a working fluid through the piston assembly. The first valve assembly is disposed about a sleeve with a valve nut securing them within the housing. The second valve assembly is threadedly secured in the housing, with a pin holding it together. The housing including a coil and an armature, axially slidable through a plunger guide with a spring biasing the armature to a first position with fluid allowed to flow through the sleeve to bypass the first valve. The armature slides to a second position with fluid not bypassing the first valve in response to the coil being energized by an electrical cable which extends through the piston rod.

18 Claims, 4 Drawing Sheets

(56) References Cited

U.S. PATENT DOCUMENTS

| | | | |
|---|---|---|---|
| 4,974,707 A | | 12/1990 | Neumann et al. |
| 5,094,321 A | | 3/1992 | Neumann |
| 5,180,186 A | | 1/1993 | Charles et al. |
| 5,392,885 A | | 2/1995 | Patzenhauer et al. |
| 5,551,541 A | * | 9/1996 | Forster ............ F16F 9/34 188/315 |
| 5,647,461 A | | 7/1997 | Jensen et al. |
| 5,699,885 A | * | 12/1997 | Forster ............ F16F 9/465 188/317 |
| 5,833,037 A | * | 11/1998 | Preukschat ....... F16F 9/466 188/299.1 |
| 6,460,663 B1 | | 10/2002 | Huang |
| 6,668,986 B2 | | 12/2003 | Moradmand et al. |
| 6,668,987 B2 | | 12/2003 | Bataille et al. |
| 7,156,214 B2 | | 1/2007 | Pradel et al. |
| 8,418,723 B2 | | 4/2013 | Tsuchiya et al. |
| 8,678,148 B2 | | 3/2014 | Piotrowski et al. |
| 8,935,047 B2 | | 1/2015 | Sekiya |
| 8,997,952 B2 | * | 4/2015 | Goetz ............ F16F 9/464 188/282.4 |
| 9,182,005 B2 | | 11/2015 | Goldasz et al. |
| 9,217,484 B2 | | 12/2015 | Slusarczyk et al. |
| 9,267,607 B2 | | 2/2016 | Forster |
| 9,285,009 B2 | | 3/2016 | Grzesik et al. |
| 9,322,451 B2 | | 4/2016 | Schumann et al. |
| 9,334,919 B2 | | 5/2016 | Flacht et al. |
| 2003/0127294 A1 | * | 7/2003 | Moradmand ....... F16F 9/466 188/282.5 |
| 2004/0154888 A1 | | 8/2004 | Lisenker et al. |
| 2013/0248021 A1 | | 9/2013 | Forster |
| 2014/0217661 A1 | | 8/2014 | Schumann et al. |
| 2015/0041264 A1 | | 2/2015 | Goldasz et al. |
| 2015/0047936 A1 | | 2/2015 | Slusarczyk et al. |
| 2015/0240902 A1 | | 8/2015 | Slusarczyk et al. |
| 2015/0246695 A1 | | 9/2015 | Van Der Knaap et al. |
| 2015/0330475 A1 | | 11/2015 | Slusarczyk et al. |
| 2016/0236533 A1 | * | 8/2016 | Inagaki ............ B60G 17/08 |

FOREIGN PATENT DOCUMENTS

| | | |
|---|---|---|
| CN | 103883666 | 6/2014 |
| CN | 103998814 | 8/2014 |
| CN | 105723115 | 6/2016 |
| DE | 4008326 C1 | 7/1991 |
| DE | 4002882 A1 | 8/1991 |
| WO | 2012072338 A1 | 6/2012 |

OTHER PUBLICATIONS

First Office Action and search report dated Jan. 28, 2019 for counterpart Chinese patent application No. 201710998079.5 along with machine EN translation.

Notice of Preliminary Rejection issued for corresponding Korean Patent Application No. 10-2017-0153112 dated Mar. 4, 2019 with an English translation.

* cited by examiner

DUAL MODE HYDRAULIC DAMPER

CROSS REFERENCE TO RELATED APPLICATION

This application claims priority to U.S. Provisional Application Ser. No. 62/423,867 filed Nov. 18, 2016, which is incorporated herein by reference in its entirety.

BACKGROUND OF THE INVENTION

Field of the Invention

The invention relates to a hydraulic damper, in particular a motor vehicle suspension damper. More specifically, a hydraulic damper electrically switchable between two different stiffness settings.

Background of the Invention

There is a new field of demand in the automotive suspension area in addition to active and semi-active dampers. There exists a demand for dampers which are operable in either of two different stiffness settings (soft & firm), also known as "comfort mode" and "sport mode", respectively. Such "dual mode" dampers may be switchable manually by the user, such as by a button on the dashboard, or automatically, such as by a vehicle's ECU.

U.S. Pat. No. 7,156,214 discloses a hydraulic damper piston with two valve assemblies and an electric actuator which selectively allows fluid to flow through one of the valve assemblies, while at the same time causing internal pistons to move in order to adjust the effective volume of the compression and rebound chambers.

U.S. Pat. No. 6,668,987 discloses a hydraulic damper piston which includes a valve body with rebound and compression passages and with a plurality of compression discs and a plurality of rebound discs deflectably covering the compression passages and rebound passages respectively for restricting the flow of the working fluid therebetween during the a corresponding stroke and for blocking the flow of the working fluid therebetween during the opposite stroke of the damper.

There exists a need in the market for a dual-mode hydraulic motor vehicle suspension damper which is operable in either of two different stiffness settings in response to a binary (on/off) electrical signal, and which includes a simple design with a minimum number of actuated, or moving parts. Ideally, such a damper would incorporate elements, such as valve components or assemblies, which are proven effective and reliable, and which may benefit from an economy of scale by being used in other, mass produced, suspension dampers.

SUMMARY OF THE INVENTION

The invention provides for a hydraulic damper, in particular a motor vehicle suspension damper including a tube filled with working liquid inside of which a piston assembly is disposed, dividing the tube into a compression chamber and a rebound chamber.

The piston assembly includes a housing defining an interior space, with an opening in the housing to allow the working liquid to flow between the rebound chamber and a first internal chamber in the interior space.

The piston assembly includes an armature defining a first borehole extending therethrough and a sleeve defining a bypass passage in fluid communication with the first borehole. A first valve assembly separates the first internal chamber from a second internal chamber in fluid communication with the bypass passage. A second valve assembly separates the second internal chamber from the compression chamber of the tube.

A spring engages and biases the armature to a first position, also known as a default position, with the rebound chamber in fluid communication with the bypass passage. The armature is moveable to a second position in response to an electrical current in a coil of conductive wire, in which fluid communication between the rebound chamber and the bypass passage is blocked.

In the first position, with the coil not energized, the armature causes the working fluid to bypass the first valve in both rebound and compression strokes of the damper. The working fluid is primarily restricted only by the second valve assembly. As such, with the coil deenergized, the hydraulic damper operates in a less stiff, or "comfort mode". With the coil energized, the armature moves to the second position, in which the working fluid does not bypass the first valve, and instead is restricted by both the first and second valves in both rebound and compression strokes to provide a stiffer dampening effect. In other words, the damper may be placed in a stiffer, or "sport mode" by energizing the coil, and the damper will default to a less stiff, or "comfort mode" with the coil de-energized.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
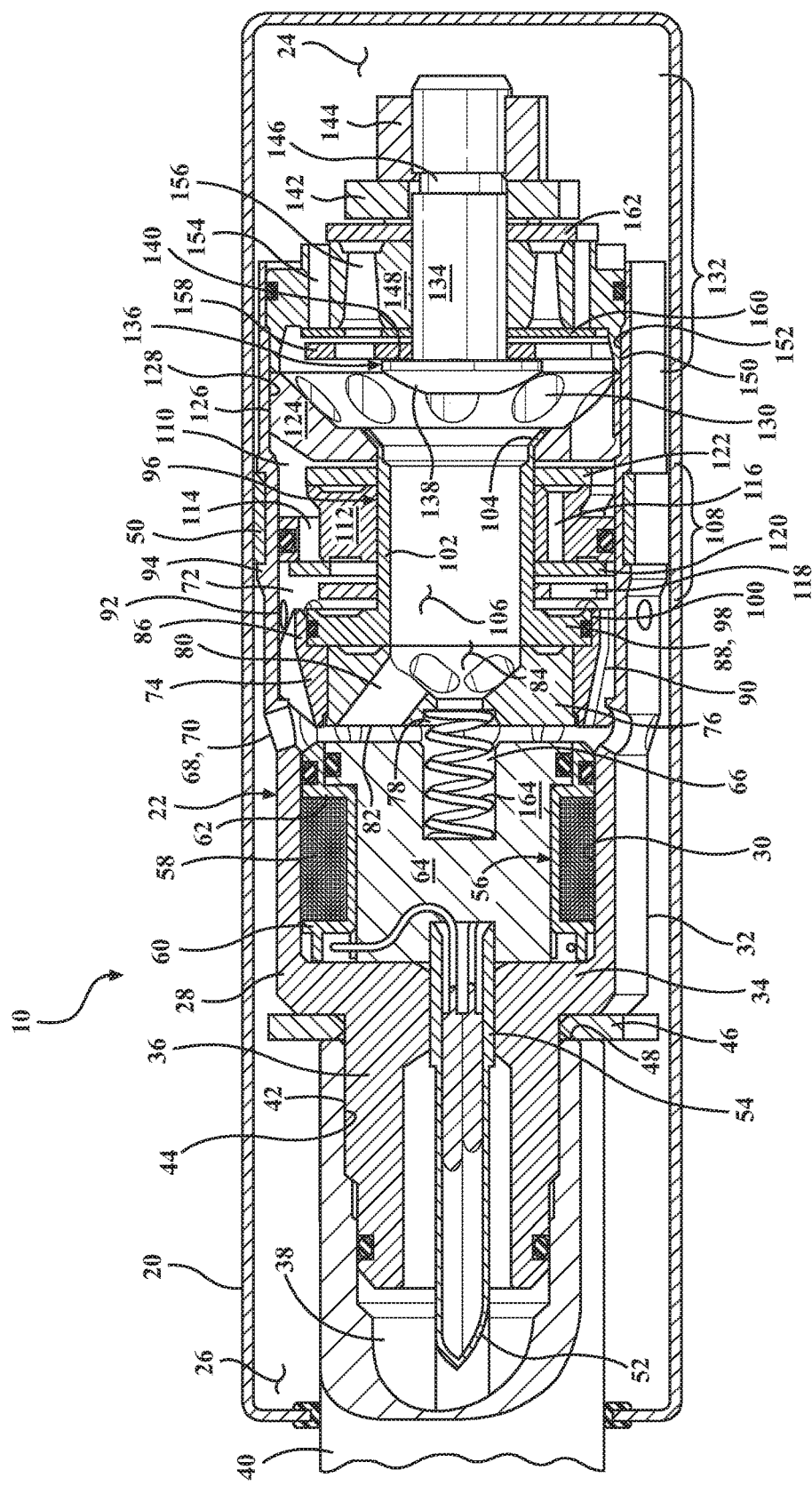
FIG. 1 is a schematic cross-sectional view of an exemplary mono-tube hydraulic damper showing its main components according to the present invention.
Figure 2:
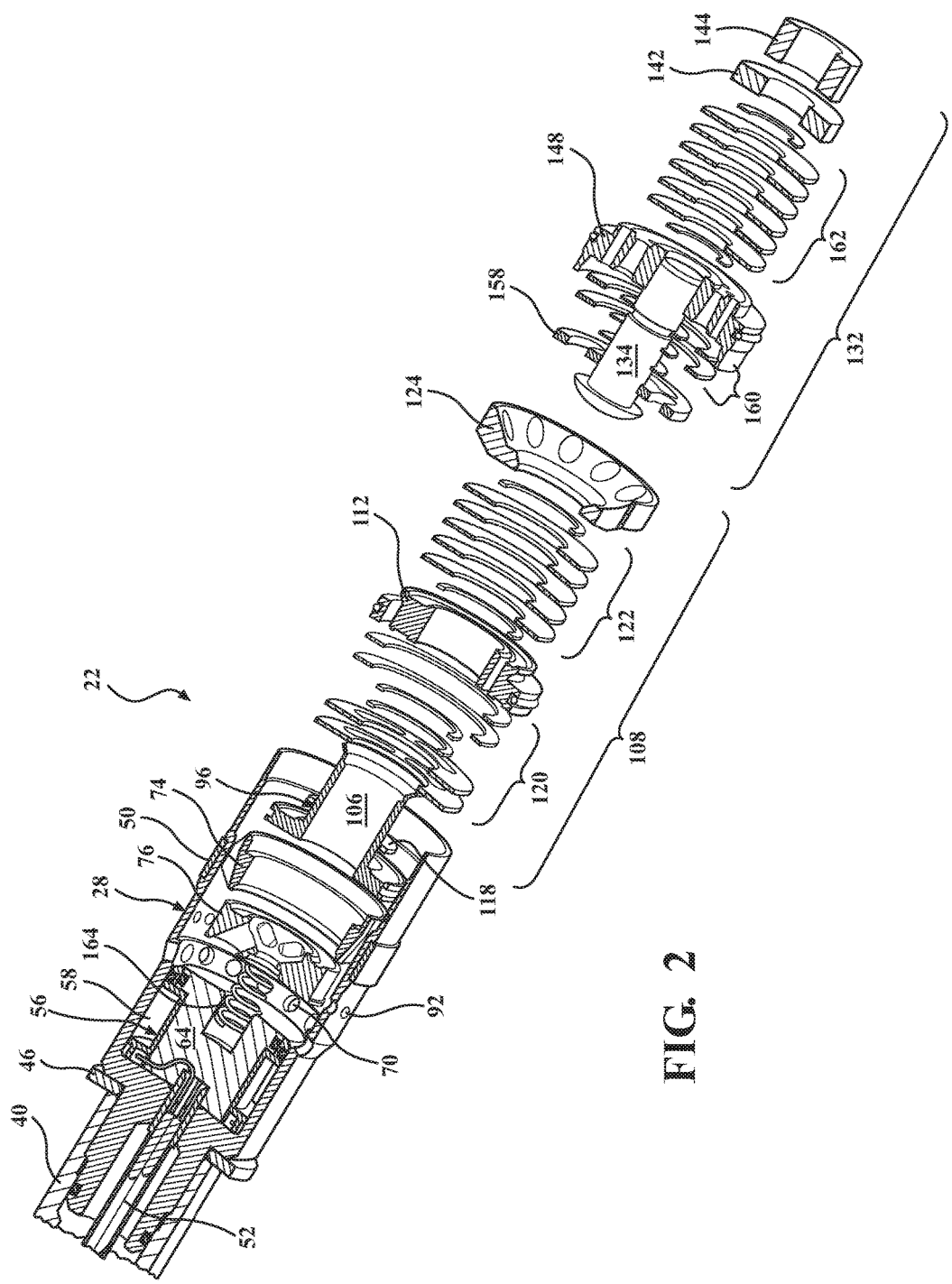
FIG. 2 is an exploded schematic cross-sectional view of an exemplary mono-tube hydraulic damper showing its main components according to the present invention.

Referring to the Figures, wherein like numerals indicate corresponding parts throughout the several views, a hydraulic damper 10, in particular a motor vehicle suspension damper 10 is generally shown and described in cross section in FIG. 1 and in exploded view in FIG. 2.

As shown in FIG. 1, the hydraulic damper 10 includes a tube 20 which is substantially closed at both ends and filled with working liquid, inside of which a piston assembly 22 is disposed, dividing the tube 20 into a compression chamber 24 and a rebound chamber 26. The piston assembly 22 controls the flow of working liquid passing therethrough during rebound and compression strokes of the damper 10.

The piston assembly 22 includes a housing 28 having a hollow cylindrical shape disposed about an axis A and defining an interior surface 30 and an exterior surface 32, each extending axially and circumferentially from a bottom 34 to define an interior space. A stem 36 having a cylindrical shape extends from the bottom 34 axially away from the housing 28 and fits within a hollow end 38 of a piston rod 40 and defines a first external thread 42 for engaging a first internal thread 44 in the hollow end 38 of the piston rod 40 to secure the piston assembly 22 thereupon. The stem 36 also defines a first annular channel thereabout holding a first O-ring providing a seal between the stem 36 and the hollow end 38 of the piston rod 40. A first retaining ring 46 may be disposed between the bottom 34 and a first shoulder 48 of the piston rod 40 for holding the piston assembly 22 thereupon by preventing the piston assembly 22 from unscrewing from the piston rod 40.

An annular seal 50 is disposed circumferentially about the housing 28 of the piston assembly 22 for sealingly engaging the tube 20 and dividing the compression chamber 24 from the rebound chamber 26.

An electrical cable 52 extends through the piston rod 40 and through the stem 36 and the bottom 34 of the piston assembly 22. A ferrule 54 surrounds and secures the electrical cable 52 in the piston assembly 22 at the point where the electrical cable 52 passes through the bottom 34 of the piston assembly 22, and may provide a fluid-tight seal around the electrical cable 52.

As shown in FIG. 1, the piston assembly 22 includes a spool 56 disposed in the interior space of the housing 28 adjacent the bottom 34 with a coil 58 of conductive wire in electrical communication with the electrical cable 52 wrapped about the spool 56 between a radial first wall 60 located adjacent to the bottom 34 and a radial second wall 62 axially spaced from the bottom 34. The radial second wall 62 defines a second annular channel which holds a second O-ring for sealingly engaging the interior surface 30 and isolating the coil 58 from the working liquid. An electromagnet core 64 is disposed within the spool 56 and inside of the coil 58. The electromagnet core 64 defines a first pocket 66 extending axially and partially therethrough with an opening opposite the bottom 34 of the housing 28.

The interior and exterior surfaces 30, 32 of the housing 28 define a first step 68 extending circumferentially thereabout and adjacent the second wall 62 of the spool 56 and widening to a larger diameter away from the bottom 34 with a plurality of first transverse openings 70 therethrough and circumferentially thereabout to allow free flow of the working liquid between the rebound chamber 26 and a first internal chamber 72 in the interior space of the housing 28.

The piston assembly 22 also includes a plunger guide 74 disposed in the interior space of the housing 28 engaging the interior surface 30 at the first step 68 and defining a guide chamber having a cylindrical shape coaxial with the housing 28 with an armature 76 disposed therein and moveable between a first position axially spaced from the electromagnet core 64 and a second position contacting the electromagnet core 64. The armature 76 defines a second pocket 78 having a cylindrical shape coaxial with the housing 28 extending partially therethrough and facing the first pocket 66 in the electromagnet core 64. The armature 76 also defines a plurality of first boreholes 80 extending therethrough and angled inwardly from a lower end 82 adjacent the electromagnet core 64 to a central chamber 84 in the armature 76 axially spaced from the electromagnet core 64. A protrusion 86 extends circumferentially and axially from the plunger guide 74 away from the bottom 34 and defines a third pocket 88 having a cylindrical shape coaxial with the housing 28. A plurality of connecting passages 90 extend axially through and circumferentially about the plunger guide 74 to allow free flow of the working liquid from the first transverse openings 70 to the first internal chamber 72 axially beyond the plunger guide 74, away from the bottom 34 of the housing 28.

The piston assembly 22 also includes a plurality second transverse openings 92 extending through and circumferentially about the housing 28 proximate to the protrusion 86 in the plunger guide 74 to allow additional flow of the working liquid between the rebound chamber 26 and the first internal chamber 72.

A second step in the exterior surface 32 of the housing 28 defines a widened portion 94 of the piston assembly 22 with the annular seal 50 disposed thereupon and with the transverse openings 70, 92 disposed between the bottom 34 and the widened portion 94.

The piston assembly 22 also includes a sleeve 96 having a flange 98 disposed within the third pocket 88 of the plunger guide 74 and which extends to a rim 100, which defines a third annular channel holding a third O-Ring forming a seal between the flange 98 and the plunger guide 74. The sleeve 96 also includes a tubular portion 102 which extends axially from the flange 98 away from the bottom 34 to a flared end 104 and with the flange 98 and the tubular portion 102 together defining a bypass passage 106 extending axially therethrough and in fluid communication with the first boreholes 80 of the armature 76.

A first valve assembly 108 is disposed circumferentially about the sleeve 96 and separates the first internal chamber 72 from a second internal chamber 110, which is in fluid communication with the bypass passage 106. The first valve assembly 108 includes a first valve body 112 disposed circumferentially about the sleeve 96 and extending to a peripheral edge adjacent the interior surface 30 and defining a fourth annular channel holding a fourth O-Ring forming a seal therebetween. The first valve body 112 also defines a plurality of first compression passages 114 and a plurality of first rebound passages 116, each extending axially therethrough. A first stop member 118 is disposed adjacent the flange 98 and spaced therefrom by a first washer with a plurality of first compression discs 120 disposed between the first stop member 118 and the first valve body 112 covering, but deflectable off of the first compression passages 114. The first stop member 118 may limit the amount of deflection of the first compression discs 120 away from the first valve body 112. A second washer and a third washer may be disposed on either side of the first compression discs 120 for axially supporting and sealing them against the sleeve 96. More specifically, the first compression discs 120 separate the first compression passages 114 from the first internal chamber 72 for restricting the flow of the working fluid therebetween during the compression stroke and for blocking the flow of the working fluid therebetween during the rebound stroke. The first valve assembly 108 also includes plurality of first rebound discs 122 disposed adjacent to the first valve body 112 opposite the first compression discs 120 covering, but deflectable off of the first rebound passages 116. A fourth washer and a fifth washer may be disposed on either side of the first rebound discs 122 for axially supporting and sealing them against the sleeve 96. More specifically, the first rebound discs 122 separate the first rebound passages 116 from the second internal chamber 110 for restricting the flow of the working fluid therebetween during the rebound stroke and for blocking the flow of the working fluid therebetween during the compression stroke.

In other words, the first compression discs 120 are configured to deflect axially away from the first valve body 112 in response and opposition to the working fluid being forced through the first compression passages 114 as a result of the piston assembly 22 being pushed into the compression chamber 24 when the hydraulic damper 10 is in a compression stroke. The first rebound discs 122 are configured to deflect axially away from the first valve body 112 in response and opposition to the working fluid being forced through the first rebound passages 116 as a result of the piston assembly 22 being pulled out of the compression chamber 24 when the hydraulic damper 10 is in a rebound stroke.

A valve nut 124 is disposed in the second internal chamber 110 and secured around the flared end 104 of the sleeve 96, such as with a crimped interference fit. The valve nut 124 extends to a peripheral edge defining a second external thread 126 for engaging a second internal thread 128 in the interior surface 30 of the housing 28 for positioning and securing the sleeve 96 and the first valve assembly 108 within the housing 28. The valve nut 124 defines a plurality of second boreholes 130 for allowing the working fluid to freely pass axially therethrough. The valve nut 124 may also limit the amount of deflection of the first rebound discs 122 away from the first valve body 112.

A second valve assembly 132, similar in construction and function to the first valve assembly 108, is disposed in the housing 28 adjacent the valve nut 124 and axially opposite the bottom 34, and separating the second internal chamber 110 from the compression chamber 24 of the tube 20. The second valve assembly 132 is held together by a pin 134 having a generally cylindrical shape located partially within and coaxial with the housing 28, with the pin 134 including a head 136 with a rounded top 138 and a flat second shoulder 140 disposed in the second internal chamber 110. The pin 134 extends axially away from the bottom 34 and through the second valve assembly 132. A second retaining ring 142 is disposed about the pin 134 and held in place by a fastener 144, which engages an annular slot 146 in the pin 134 spaced apart from the head 136. The fastener 144 may be a nut, threaded onto the pin 134, or may use any other suitable connection means.

The second valve assembly 132 includes a second valve body 148, which extends to a peripheral edge defining a third external thread 150 for engaging a third internal thread 152 in the housing 28, thereby holding the second valve assembly 132 in position in the housing 28. The peripheral edge of the second valve body 148 also defines a fifth annular channel holding a fifth O-Ring forming a seal with said housing 28. The second valve assembly 132 further defines a plurality of second compression passages 154 and a plurality of second rebound passages 156, each extending axially therethrough. A second stop member 158 is disposed in the second internal chamber 110, engaging the second shoulder 140 of the pin 134. A plurality of second compression discs 160 are disposed between the second stop member 158 and the second valve body 148 covering, but deflectable off of the second compression passages 154. The second stop member 158 may limit the amount of deflection of the second compression discs 160 away from the second valve body 148. A sixth washer may be disposed between the second stop member 158 and the second compression discs 160. More specifically, the second compression discs 160 separate the second compression passages 154 from the second internal chamber 110 for restricting the flow of the working fluid therebetween during the compression stroke and for blocking the flow of the working fluid therebetween during the rebound stroke. The second valve assembly 132 also includes a plurality of second rebound discs 162 disposed adjacent to the second valve body 148 opposite the second compression discs 160 covering, but deflectable off of the second rebound passages 156. The second retaining ring 142 may limit the amount of deflection of the second rebound discs 162 away from the second valve body 148. More specifically, the second rebound discs 162 separate the second rebound passages 156 from the compression chamber 24 of the tube 20 for restricting the flow of the working fluid therebetween during the rebound stroke and for blocking the flow of the working fluid therebetween during the compression stroke.

In other words, the second compression discs 160 are configured to deflect axially away from the second valve body 148 in response and opposition to the working fluid being forced through the second compression passages 154 as a result of the piston assembly 22 being pushed into the compression chamber 24 with the hydraulic damper 10 in a compression stroke. The second rebound discs 162 are configured to deflect axially away from the second valve body 148 in response and opposition to the working fluid being forced through the second rebound passages 156 as a result of the piston assembly 22 being pulled out of the compression chamber 24 with the hydraulic damper 10 in a rebound stroke.

Figure 3A:
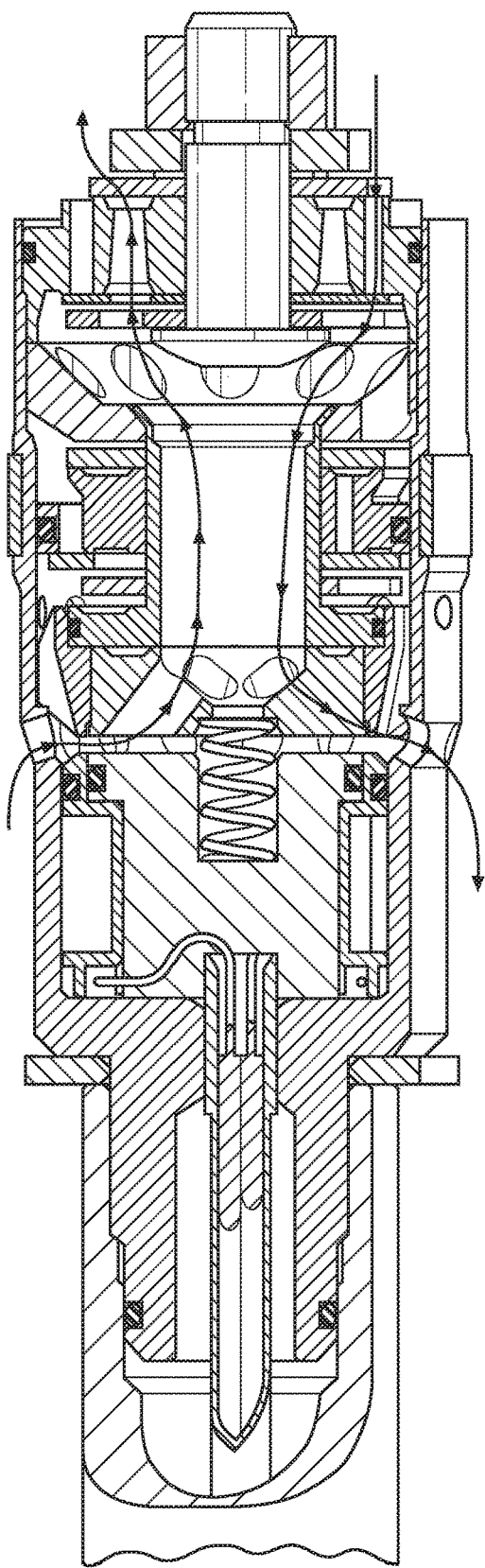
FIG. 3A is a schematic cross-sectional view of a piston assembly according to the present invention and showing the rebound and compression flow paths with an armature in the first position.

As shown in FIG. 1, a spring 164 is disposed within and between the first pocket 66 of the electromagnet core 64 and the second pocket 78 of the armature 76 for biasing the armature 76 to the first position spaced from the electromagnet core 64 and with the rebound chamber 26 in fluid communication with the bypass passage 106 for allowing the working fluid to bypass the first valve assembly 108 in both rebound and compression strokes to provide a softer dampening effect. FIG. 3A shows the armature 76 in the first position, with the corresponding fluid paths in the rebound and compression strokes.

Figure 3B:
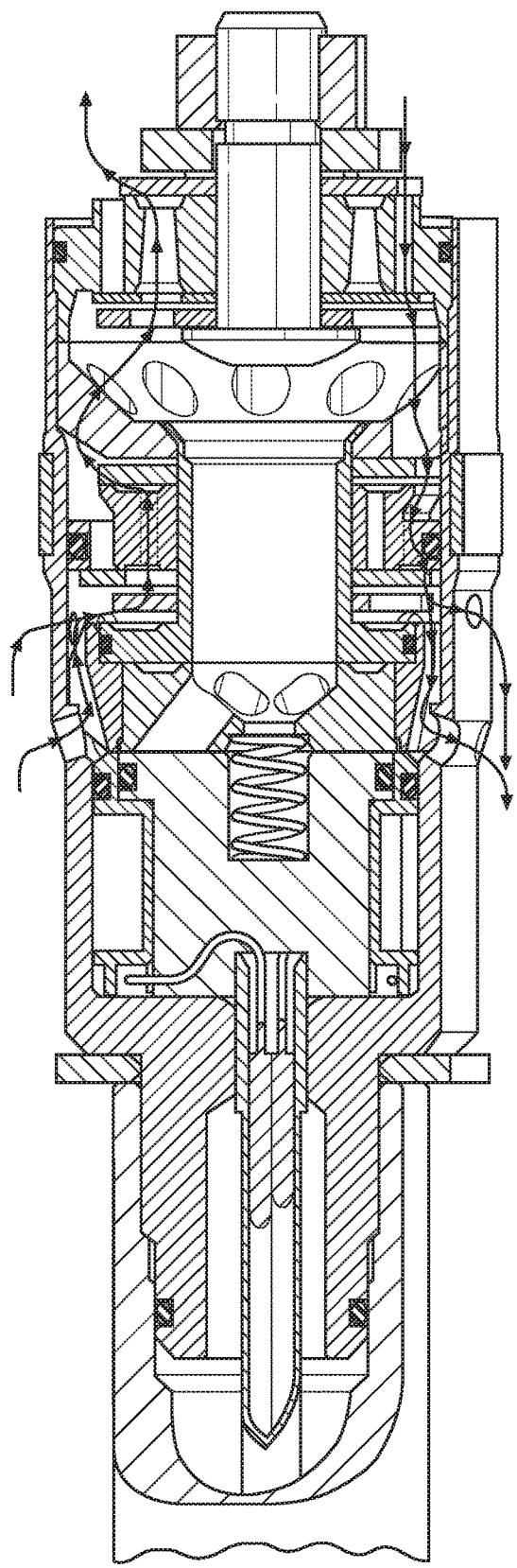
FIG. 3B is a schematic cross-sectional view of a piston assembly according to the present invention and showing the rebound and compression flow paths with an armature in the second position.

In operation, the armature 76 moves axially to the second position adjacent to the electromagnet core 64, with the first boreholes 80 covered to block fluid communication between the rebound chamber 26 and the bypass passage 106 in response to magnetic attraction between the armature 76 and the electromagnet core 64 due to an electrical current in the coil 58 as supplied via the electrical cable 52. In the second position, the working fluid passing through the piston assembly 22 must pass through both the first valve assembly 108 and the second valve assembly 132 in both rebound and compression strokes, thereby providing a stiffer dampening effect. In other words, the damper 10 may be placed in a stiffer, or "sport mode" by energizing the coil 58, and the damper 10 will default to a less stiff, or "comfort mode" with the coil 58 de-energized. FIG. 3B shows the armature 76 in the second position, with the corresponding fluid paths in the rebound and compression strokes.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A hydraulic damper comprising:
a tube substantially closed at both ends and filled with working liquid inside of which a piston assembly is disposed dividing said tube into a compression chamber and a rebound chamber;
said piston assembly including a housing disposed about an axis and extending axially from a bottom to define an interior space;
an opening in said housing to allow flow of the working liquid between said rebound chamber and a first internal chamber in said interior space;
an armature defining a first borehole extending therethrough;
a sleeve defining a bypass passage in fluid communication with said first borehole;
a first valve assembly separating said first internal chamber from a second internal chamber in fluid communication with said bypass passage;
a second valve assembly separating said second internal chamber from said compression chamber of said tube;
a spring biasing said armature to a first position with said rebound chamber in fluid communication with said bypass passage; and
said armature being moveable to a second position blocking fluid communication between said rebound chamber and said bypass passage in response to an electrical current in a coil;
wherein said first valve assembly includes a first valve body defining, within the first valve body, a first compression passage and a first rebound passage each extending axially through the first valve body, and a first compression disc disposed between said first internal chamber and said first compression passage and a first rebound disc disposed between said first rebound passage and said second internal chamber;
wherein said first compression passage is radially spaced from said first rebound passage along the entire axial length of said first compression passage; and
wherein the first compression disc and the first rebound disc are disposed at opposite axial sides of the first valve body;
wherein said first compression disc deflectably covers said first compression passage and is configured to deflect away from said first valve body in response and opposition to the working fluid being forced through said first compression passages; and
wherein said first rebound disc deflectably covers said first rebound passage and is configured to deflect away from said first valve body in response and opposition to the working fluid being forced through said first rebound passages.

2. The hydraulic damper as set forth in claim 1 wherein said first valve assembly is disposed circumferentially about said sleeve.

3. The hydraulic damper as set forth in claim 1 wherein said second valve assembly includes a second valve body defining a second compression passage and a second rebound passage, a second compression disc disposed between said second internal chamber and said second compression passage and a second rebound disc disposed between said second rebound passage and said compression chamber.

4. The hydraulic damper as set forth in claim 3 wherein said second compression disc deflectably covers said second compression passage and is configured to deflect away from said second valve body in response and opposition to the working fluid being forced through said second compression passages; and
wherein said second rebound disc deflectably covers said second rebound passage and is configured to deflect away from said second valve body in response and opposition to the working fluid being forced through said second rebound passages.

5. The hydraulic damper as set forth in claim 3 wherein said second valve body extends to a peripheral edge sealingly engaging said housing.

6. The hydraulic damper as set forth in claim 5 wherein said peripheral edge of said second valve body defines a third external thread for engaging a third internal thread in said housing to position and secure said second valve assembly in said piston assembly.

7. The hydraulic damper as set forth in claim 3 further including a pin holding said second valve assembly together, with said pin extending along and about said axis from a head disposed in said second internal chamber with a flat second shoulder engaging a second stop member and said pin extending axially through said second valve assembly and held in place by a fastener opposite said head.

8. The hydraulic damper as set forth in claim 1 further including a valve nut disposed in said second internal chamber and extending to a peripheral edge defining a second external thread for engaging a second internal thread in said housing for securing and positioning said sleeve within said housing.

9. The hydraulic damper as set forth in claim 8 further including a second borehole extending axially through said valve nut.

10. The hydraulic damper as set forth in claim 8 wherein said valve nut is secured around said sleeve with a crimped interference connection.

11. The hydraulic damper as set forth in claim 1 further including a plunger guide disposed in said interior space of said housing and defining a guide chamber; and with said armature disposed in said guide chamber.

12. The hydraulic damper as set forth in claim 11 wherein said plunger guide includes a connecting passage extending axially therethrough for allowing a free flow of the working liquid from said opening in the housing to said first internal chamber.

13. The hydraulic damper as set forth in claim 11 wherein said plunger guide engages a first step in said housing for positioning said plunger guide a predetermined axial distance away from said bottom.

14. The hydraulic damper as set forth in claim 11 wherein said sleeve sealingly engages said plunger guide.

15. The hydraulic damper as set forth in claim 11 wherein said plunger guide further includes a protrusion extending circumferentially and axially therefrom away from said bottom to define a third pocket and wherein a portion of said sleeve is disposed within said third pocket.

16. The hydraulic damper as set forth in claim 1 further including a piston rod extending through and outside of said tube and an electrical cable extending through said piston rod and in electrical communication with said coil.

17. The hydraulic damper as set forth in claim 1 further including an electromagnet core disposed within said coil.

18. The hydraulic damper as set forth in claim 17 wherein said armature sealingly engages said electromagnet core in the second position for blocking fluid communication between said rebound chamber and said bypass passage.

* * * * *